US010985839B2

(12) United States Patent
Tanaka et al.

(10) Patent No.: US 10,985,839 B2
(45) Date of Patent: Apr. 20, 2021

(54) 3D-COMPATIBLE DIRECTIONAL OPTICAL ANTENNA

(71) Applicant: SoftBank Corp., Tokyo (JP)

(72) Inventors: Shinichi Tanaka, Tokyo (JP); Hiroshi Ishihara, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 16/629,683

(22) PCT Filed: Jun. 12, 2018

(86) PCT No.: PCT/JP2018/022408
§ 371 (c)(1),
(2) Date: Jan. 9, 2020

(87) PCT Pub. No.: WO2019/012894
PCT Pub. Date: Jan. 17, 2019

(65) Prior Publication Data
US 2021/0083769 A1    Mar. 18, 2021

(30) Foreign Application Priority Data

Jul. 14, 2017  (JP) .............................. JP2017-138541

(51) Int. Cl.
*H04B 10/112*  (2013.01)
*H04B 7/185*  (2006.01)
(Continued)

(52) U.S. Cl.
CPC ....... *H04B 10/1129* (2013.01); *H04B 7/1851* (2013.01); *H04B 7/18504* (2013.01);
(Continued)

(58) Field of Classification Search
CPC ........ H04B 10/11–1129; H04B 10/118; H04B 7/185–18597; H04W 16/26–30
(Continued)

(56) References Cited

U.S. PATENT DOCUMENTS 9,853,740 B1 * 12/2017 Bortz ................... H04B 10/691
2003/0043436 A1 * 3/2003 Nagai ................ H04B 10/1143
398/126
(Continued)

FOREIGN PATENT DOCUMENTS

JP    2001-077759 A    3/2001
JP    2003-069505 A    3/2003
(Continued)

OTHER PUBLICATIONS

Lte, "Evolved Universal Terrestrial Radio Access (E-UTRA) and Evolved Universal Terrestrial Radio Access Network (E-UTRAN)", Overall description; Stage 2, Dec. 2014, 3GPP TS 36.300, Release 10, ARIB STD-T104-36.300 V10.12.0.
(Continued)

*Primary Examiner* — Li Liu
(74) *Attorney, Agent, or Firm* — Muirhead and Saturnelli, LLC

(57) ABSTRACT

In the mobile communications of the fifth generation or the like, a radio relay apparatus capable of stably over a wide area realize a three-dimensional network, in which a propagation delay is low, a simultaneous connection with a large number of terminal apparatuses in a wide-range and high-speed communication can be performed, and a system capacity per unit area is large, in radio communications with terminal apparatuses including devices for the IoT, and there is no influence on radio wave frequency resources, is provided. The radio relay apparatus comprises a floating object provided with a radio relay station and controlled to be located in a floating airspace with an altitude less than or equal to 100 [km] by an autonomous control or an external control, an optical communication section for performing optical communication with an optical communication destination via an optical antenna apparatus controllable to change outgoing directional beam, an information acquisi-
(Continued)

tion section for acquiring at least one of optical-beam control information provided with a radio relay station and a reception sensitivity of the optical communication section, and a beam control section for controlling a directional beam of the optical antenna apparatus based on information acquired by the information acquisition section.

23 Claims, 11 Drawing Sheets

(51) Int. Cl.
  *H04W 16/28* (2009.01)
  *H04B 10/118* (2013.01)
  *H04W 16/26* (2009.01)

(52) U.S. Cl.
  CPC ....... *H04B 7/18506* (2013.01); *H04B 10/118* (2013.01); *H04B 10/1123* (2013.01); *H04W 16/28* (2013.01); *H04W 16/26* (2013.01)

(58) Field of Classification Search
  USPC .................................................. 398/118–131
  See application file for complete search history.

(56) References Cited

U.S. PATENT DOCUMENTS

| | | | | |
|---|---|---|---|---|
| 2003/0141409 A1* | 7/2003 | Lisoski | ................. | B64C 3/52 244/13 |
| 2004/0258415 A1* | 12/2004 | Boone | ............... | H04B 10/1125 398/125 |
| 2006/0018663 A1* | 1/2006 | Moursund | .......... | H04B 10/1125 398/135 |
| 2008/0207200 A1* | 8/2008 | Fein | ......................... | H04B 1/38 455/426.1 |
| 2014/0376914 A1* | 12/2014 | Miniscalco | ........ | H04B 7/18504 398/58 |
| 2015/0229376 A1* | 8/2015 | Kikuchi | ................... | H01Q 3/24 342/367 |
| 2016/0156406 A1* | 6/2016 | Frolov | .................. | H04W 16/28 455/431 |
| 2016/0294472 A1* | 10/2016 | Palmer | ................. | H04B 7/0617 |
| 2017/0257167 A1* | 9/2017 | Adams | ..................... | H01Q 5/22 |
| 2017/0302368 A1* | 10/2017 | Trott | .................. | H04B 7/18502 |
| 2018/0019800 A1* | 1/2018 | Buer | ...................... | H04B 7/204 |
| 2019/0372669 A1* | 12/2019 | Ziegler | ................ | H04B 10/118 |
| 2020/0274611 A1* | 8/2020 | Mendelsohn | .......... | H01Q 1/288 |

FOREIGN PATENT DOCUMENTS

| | | |
|---|---|---|
| JP | 2003-522509 A | 7/2003 |
| JP | 2006-108919 A | 4/2006 |
| JP | 2007-013513 A | 1/2007 |
| JP | 2014-072862 A | 4/2014 |
| JP | 2015-170273 A | 9/2015 |
| JP | 2016-167691 A | 9/2016 |

OTHER PUBLICATIONS

Lte, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN)", Overall description; Stage 2, 3GPP TS 36.300, V13.5.0, Sep. 2016, Release 13.

Giovanni Romano, "3GPP RAN progress on 5G", 2016.

* cited by examiner

3D-COMPATIBLE DIRECTIONAL OPTICAL ANTENNA

TECHNICAL FIELD

The present invention relates to a 3D-compatible directional optical antenna suitable for a HAPS constructing a three-dimensional network of a fifth generation communication.

BACKGROUND ART

There is conventionally known of a communication standard called the LTE-Advanced Pro (refer to Non-Patent Literature 2), which has been developed from the LTE (Long Term Evolution)-Advanced (refer to Non-Patent Literature 1) of the 3GPP that is a communication standard of a mobile communication system. In this LTE-Advanced Pro, specifications for providing communications to devices for the IoT (Internet of Things) in recent years have been formulated. Furthermore, the fifth-generation mobile communication coping with a simultaneous connection to a large number of terminal apparatuses (also called as "UE (user equipment)", "mobile station", "communication terminal") such as devices for the IoT, a reduction of delay time, etc. is being studied (for example, refer to Non-Patent Literature 3).

CITATION LIST

Non-Patent Literature

Non-Patent Literature 1: 3GPP TS 36.300 V10.12.0 (2014-12).
Non-Patent Literature 2: 3GPP TS 36.300 V13.5.0 (2016-09).
Non-Patent Literature 3: G Romano, "3GPP RAN progress on "5G"", 3GPP, 2016.

SUMMARY OF INVENTION

Technical Problem

In the foregoing mobile communications of the fifth generation or the like, there is a problem of stably over a wide area realizing a three-dimensionalized network, in which a propagation delay is low, a simultaneous connection with a large number of terminals in a wide-range area and a high-speed communication can be performed, and a system capacity per unit area is large, in radio communications with terminal apparatuses including devices for the IoT. Furthermore, in a network in which such a high-speed and large-capacity communication is performed, there is also a problem of an influence on radio frequency resources.

Solution to Problem

A radio relay apparatus according to an aspect of the present invention is a radio relay apparatus comprising a radio relay station for relaying a radio communication between a terrestrial base station and a terminal apparatus. The radio relay station is provided in a floating object controlled so as to be located in a floating airspace with an altitude less than or equal to 100 [km] by an autonomous control or an external control. The radio relay apparatus comprises an optical communication section for performing an optical communication with an optical communication destination via an optical antenna apparatus controllable to change an outgoing directional beam, and a beam control section for acquiring optical-beam control information for directing the directional beam of the optical antenna apparatus to the optical communication destination and controlling the directional beam of the optical antenna apparatus to be directed to the optical communication destination based on the acquired optical beam control information.

In the foregoing radio relay apparatus, the optical beam control information may include at least one of an attitude and a position of the floating object, a position of the optical communication destination, and a reception strength and a reception sensitivity of the optical communication section.

In the foregoing radio relay apparatus, the optical antenna apparatus may comprise a plurality of optical antennas with outward directivities different from each other, and the beam control section may select an optical antenna to be used for an optical communication with the optical communication destination based on the optical beam control information.

In the foregoing radio relay apparatus, the beam control section may predict and sequentially select an optical antenna to be used for the optical communication with the optical communication destination based on a time change of the optical beam control information.

In the foregoing radio relay apparatus, the plurality of optical antennas may be disposed so that directional beams of the optical antennas adjacent to each other partially overlap.

In the foregoing radio relay apparatus, when switching the optical antenna, the optical communication section may perform an optical communication with the optical communication destination so as to synchronize and overlap an optical communication via each of the plurality of optical antennas with each other for a predetermined time before and after the switching.

In the foregoing radio relay apparatus, the optical communication section may control to stop or reduce a power supply to the optical antenna that is not used for the optical communication with the optical communication destination among the plurality of optical antennas.

In the foregoing radio relay apparatus, the optical antenna apparatus may comprise an optical antenna with a directivity, and an antenna drive section for driving the optical antenna to change the directional beam of the optical antenna, and the beam control section may control the antenna drive section based on the acquired optical beam control information.

In the foregoing radio relay apparatus, the optical antenna apparatus may be configured to be capable of adjusting at least one of a direction and a divergence angle of the directional beam.

In the foregoing radio relay apparatus, the floating object may be a solar plane that comprises a wing provided with a photovoltaic power generation panel for generating an electric power to be supplied to the radio relay station, and a rotationally drivable propeller mounted on the wing, or may be an airship that comprises a battery for supplying an electric power to the radio relay station.

In the foregoing radio relay apparatus, the optical communication section may control an optical strength in accordance with a change in a relative position to the optical communication destination.

In the foregoing radio relay apparatus, the optical communication section may be controlled to reduce an optical strength in a time period of night.

In the foregoing radio relay apparatus, the foregoing radio relay apparatus may comprise a remote control apparatus for remotely performing a control in the beam control section or the optical communication section.

In the foregoing radio relay apparatus, the communication destination of the optical communication may include another floating-type radio relay apparatus located in the floating airspace, or may include an artificial satellite.

In the foregoing radio relay apparatus, a three-dimensional cell may be formed in a predetermined cell-formation target airspace between a ground level or a sea level, and an altitude of the cell-formation target airspace may be less than or equal to 10 [km], and further may be 50 [m] or more and 1 [km] or less.

In the foregoing radio relay apparatus, the floating object may be located in a stratosphere with an altitude more than or equal to 11 [km] and less than or equal to 50 [km].

Advantageous Effects of Invention

According to the present invention, in the foregoing mobile communications of the fifth generation or the like, it is possible to stably over a wide area realize a three-dimensional network, in which a propagation delay is low, a simultaneous connection with a large number of terminal apparatuses in a wide-range and high-speed communication can be performed, and a system capacity per unit area is large, in radio communications with terminal apparatuses including devices for the IoT, and there is no influence on radio wave frequency resources.

DESCRIPTION OF EMBODIMENTS

Hereinafter, embodiments of the present invention will be described with reference to the drawings.

Figure 1:
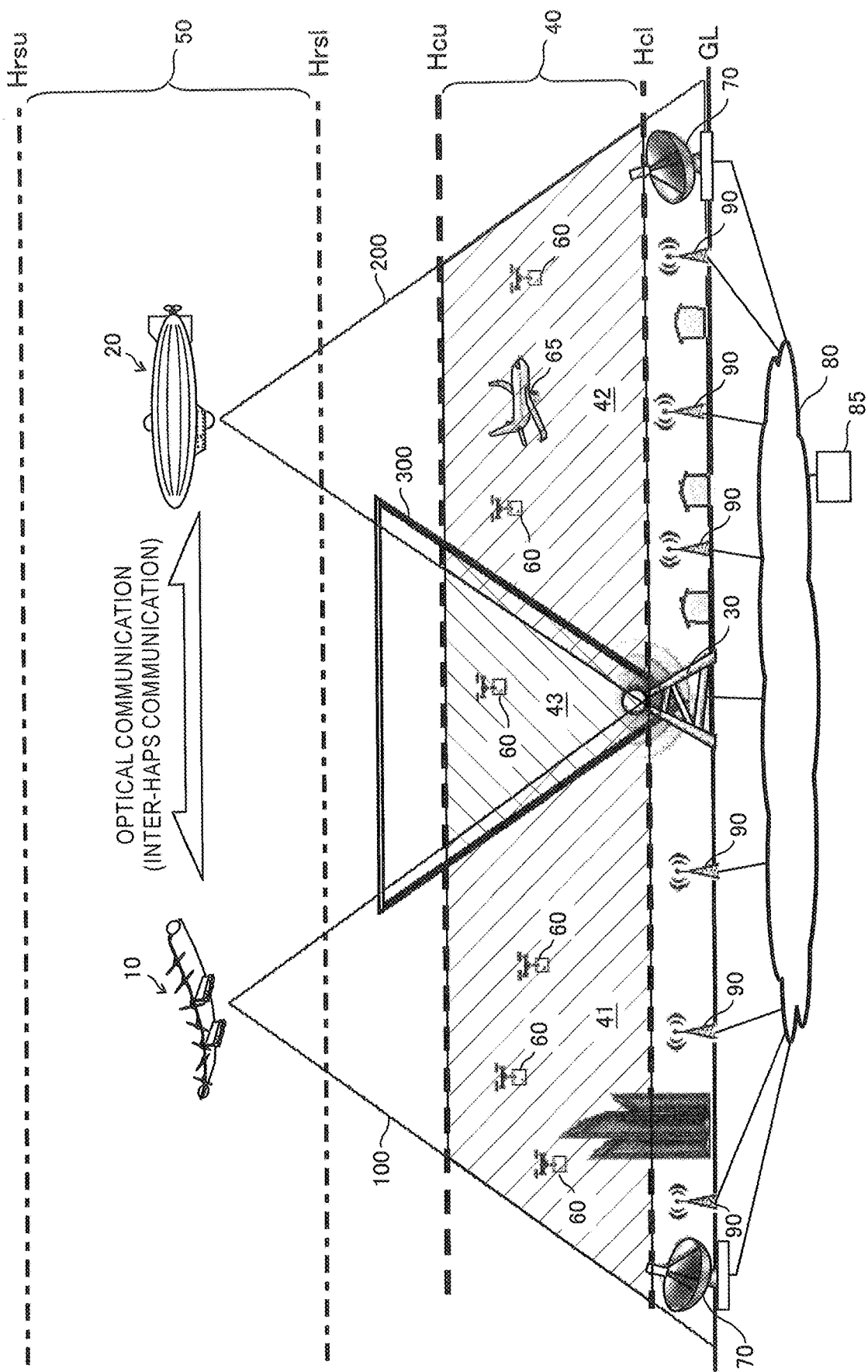
FIG. 1 is a schematic configuration diagram showing an example of an overall configuration of a communication system for realizing a three-dimensional network according to an embodiment of the present invention.

FIG. 1 is a schematic configuration diagram showing an example of an overall configuration of a communication system according to an embodiment of the present invention. The communication system according to the present embodiment is suitable for realizing a three-dimensional network of the fifth generation mobile communication corresponding to simultaneous connection to a large number of terminal apparatuses (also referred to as "mobile station", "mobile device" or "user equipment (UE)"), low delay method, etc. It is noted that, the mobile communication standard applicable to a communication system, a radio relay station, a base station, a repeater, and a terminal apparatus disclosed in this specification, includes the fifth generation mobile communication standard and next generation mobile communication standards after the fifth generation.

As shown in FIG. 1, a communication system is provided with a plurality of High Altitude Platform Stations (HAPS) (also referred to as "High Altitude Pseudo Satellite") 10 and 20 as a plurality of aerial-floating type radio relay apparatuses, and forms three-dimensional cells (three-dimensional areas) 41 and 42 as indicated by hatching areas in the figure in a cell-formation target airspace 40 at a predetermined altitude. Each of the HAPSs 10 and 20 is a floating object (for example, solar plane, airship) including a radio relay station mounted therein, which is controlled to be floated and located in a floating airspace (hereinafter also simply referred to as "airspace") 50 with high altitude of 100 [km] or less from the ground level or the sea level by an autonomous control or an external control.

The airspace 50 in which the HAPSs 10 and 20 are located is, for example, a stratospheric airspace with altitude of 11 [km] or more and 50 [km] or less. The airspace 50 in which the HAPSs 10 and 20 are located may be an airspace in the altitude range of 15 [km] or more and 25 [km] or less where weather conditions are relatively stable, and may be an airspace with altitude of about 20 [km] in particular. Each of Hrsl and Hrsu in the figure indicates relative altitudes of the lower end and the upper end of the airspace 50 with reference to the ground level (GL), in which the HAPSs 10 and 20 are located.

The cell-formation target airspace 40 is a target airspace for forming a three-dimensional cell with one or more HAPSs according to the communication system of the present embodiment. The cell-formation target airspace 40 is an airspace in a predetermined altitude range (for example, altitude range of 50 [m] or more and 1000 [m] or less) located between the airspace 50 where the HAPSs 10 and 20 are located and a cell-formation area near the ground level covered by a base station 90 such as a conventional macro-cell base station. Each of Hcl and Hcu in the figure indicates relative altitudes of the lower end and the upper end of the cell-formation target airspace 40 with reference to the ground level (GL).

It is noted that, the cell-formation target airspace 40 where the three-dimensional cell of the present embodiment is formed may be an airspace over the sea, a river or a lake.

The radio relay stations of the HAPSs 10 and 20 respectively form beams 100 and 200 for a radio communication with the terminal apparatus that is a mobile station, toward the ground level. The terminal apparatus may be a communication terminal module incorporated in a drone 60 that is an aircraft such as a small helicopter capable of remotely steering, or may be a user terminal apparatus used by a user in the airplane 65. The areas through which the beams 100 and 200 pass in the cell-formation target airspace 40 are three-dimensional cells 41 and 42. The plurality of beams 100 and 200 adjacent to each other in the cell-formation target airspace 40 may be partially overlapped with each other.

Each of the radio relay stations of the HAPSs 10 and 20 is connected to a core network of a mobile communication network 80 via a feeder station (gateway) 70 that is a relay station installed on the ground or on the sea. A communication between the HAPSs 10 and 20 and the feeder station 70 may be performed by a radio communication using radio waves such as microwaves, or may be performed by an optical communication using a laser beam or the like.

Each of the HAPSs 10 and 20 may autonomously control its own floating movement (flight) or a processing at the radio relay station, by executing a control program with a control section including a computer or the like incorporated in the inside of the HAPS. For example, each of the HAPSs 10 and 20 may acquire its own current position information (for example, GPS position information), position control information (for example, flight schedule information) stored in advance, and position information on another HAPS located in a peripheral space, etc., and autonomously control the floating movement (flight) and the processing in the radio relay station base on these information.

The floating movement (flight) of each HAPS 10 and 20 and processing in the radio relay stations may be controlled by a remote control apparatus 85 of a communication operator, which is disposed in a communication center or the like of the mobile communication network 80. In this case, the HAPSs 10 and 20 may include a communication terminal apparatus for control (for example, a mobile communication module) so that control information from the remote control apparatus 85 can be received, and terminal identification information (for example, IP address, telephone number, etc.) may be allocated to the terminal communication apparatus so as to be identified from the remote control apparatus 85. The MAC address of the communication interface may be used for identification of the communication terminal apparatus for control. Each of the HAPSs 10 and 20 may transmit information relating to the floating movement (flight) of the HAPS itself or the neighboring HAPS and the processing at the radio relay station, and information such as observation data acquired by various sensors or the like, to a predetermined destination such as the remote control apparatus 85.

In the cell-formation target airspace 40, there is a possibility that a spatial area where the beams 100 and 200 of the HAPSs 10 and 20 do not pass may occur, in which the three-dimensional cells 41 and 42 are not formed. In order to spatially complement this area, as shown in the configuration example of FIG. 1, a base station (hereinafter referred to as "ATG station") 30 may be disposed, which forms a three-dimensional cell 43 by forming a radial beam 300 from the ground or the sea side upward to make an ATG (Air To Ground) connection.

By adjusting the positions of the HAPSs 10 and 20 and the divergence angle (beam width) etc. of the beams 100 and 200 without using the ATG station, the radio relay stations of the HAPSs 10 and 20 may form the beams 100 and 200 covering the overall upper end face of the cell-formation target airspace 40 so that three-dimensional cells are formed all over the cell-formation target airspace 40.

It is noted that, the three-dimensional cell formed by the HAPSs 10 and 20 may be formed so as to reach the ground level or the sea level so as to be able to communicate also with the terminal apparatus located on the ground or on the sea.

Figure 2:
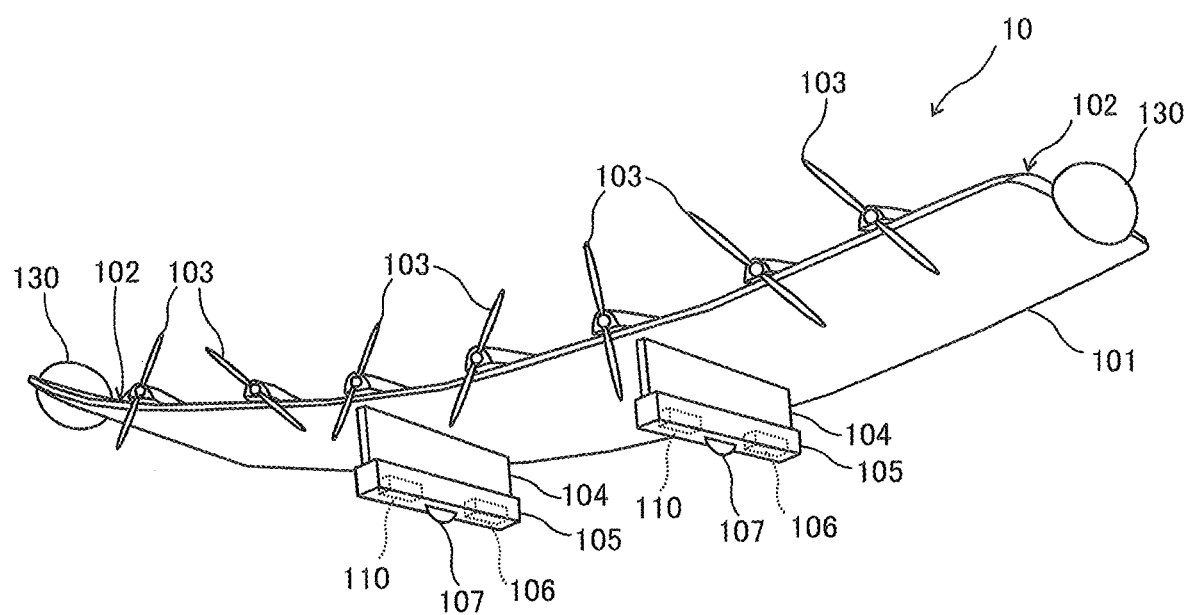
FIG. 2 is a perspective view showing an example of a HAPS used in the communication system in the embodiment.

FIG. 2 is a perspective view showing an example of the HAPS 10 used in the communication system in the embodiment. The HAPS 10 in FIG. 2 is a solar plane-type HAPS. The HAPS 10 has a main wing section 101 in which a solar-power generation panel (hereinafter referred to as "solar panel") 102 as a photovoltaic power generation section having a photovoltaic power generation function is provided on the upper surface and both end portions in the longitudinal direction are warped upward, and a plurality of motor-driven propellers 103 as a propulsion apparatus of a bus-motive power system provided at one end edge portion of the main wing section 101 in the lateral direction. Pods 105 as a plurality of apparatus accommodating sections for accommodating the mission equipment are connected to the two positions in the longitudinal direction of the lower surface of the main wing section 101 via a plate-like connecting section 104. Inside each pod 105, a radio relay station 110 as a mission equipment and a battery 106 are accommodated. On the lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay processing by the radio relay station 110 is executed.

The solar plane-type HAPS 10 can float with lift force by, for example, performing a turning flight or performing a flight along a figure of "8", and can float to stay in a predetermined range in the horizontal direction at a predetermined altitude. It is noted that, the solar plane-type HAPS 10 can also fly like a glider when the propeller 103 is not rotationally driven. For example, when electric power of the battery 106 is surplus by power generation of the solar panel 102, such as in daytime, the solar plane-type HAPS 10 rises to a high position. And when electric power cannot be generated by the solar panel 102 such as at night, the solar plane-type HAPS 10 can stop power supply from the battery 106 to the motor and can fly like a glider.

The HAPS 10 also includes an optical antenna apparatus 130 compatible with a three-dimensional directivity, which is used for optical communications with other HAPSs and artificial satellites. In the example of FIG. 2, although the optical antenna apparatuses 130 are disposed at both end portions of the main wing section 101 in a longitudinal direction, the optical antenna apparatuses 130 may be disposed at other portions of the HAPS 10.

Figure 3:
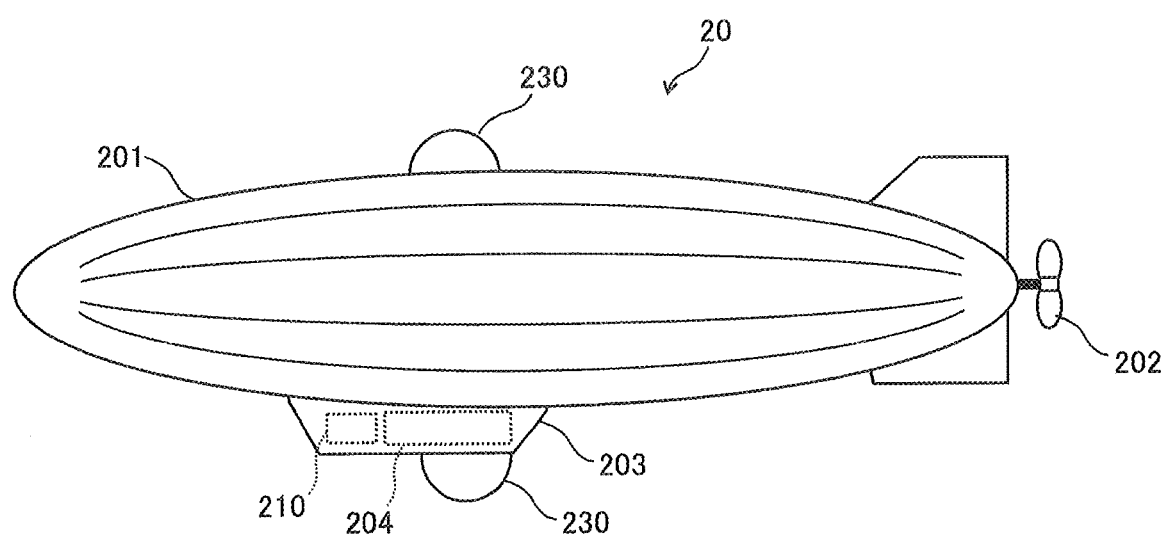
FIG. 3 is a side view showing another example of a HAPS used in the communication system in the embodiment.

FIG. 3 is a side view showing another example of the HAPS 20 used in a communication system in the embodiment. The HAPS 20 in FIG. 3 is an unmanned airship-type HAPS, and can mount a large capacity battery since the payload is large. The HAPS 20 has an airship body 201 filled with gas such as helium gas for floating by floating power, a propeller 202 driven by a motor as a propulsion apparatus of a bus-motive power system, and an equipment accommodating section 203 in which the mission equipment is accommodated. A radio relay station 210 and a battery 204 are accommodated in the equipment accommodating section 203. A motor of the propeller 202 is rotationally driven by an electric power supplied from the battery 204, and a radio relay processing by the radio relay station 210 is executed.

It is noted that, a solar panel having a photovoltaic power generation function may be provided on the top surface of the airship body 201, and an electric power generated by the solar panel is stored in the battery 204.

The unmanned airship type HAPS 20 also includes an optical antenna apparatus 230 compatible with a three-dimensional directivity, which is used for optical communications with other HAPSs and artificial satellites. In the example of FIG. 3, although the optical antenna apparatus 230 is disposed on an upper surface portion of the airship body 201 and a lower surface portion of the equipment accommodating section 203, the optical antenna apparatus 230 may be disposed on other portions of the HAPS 20.

Figure 4:
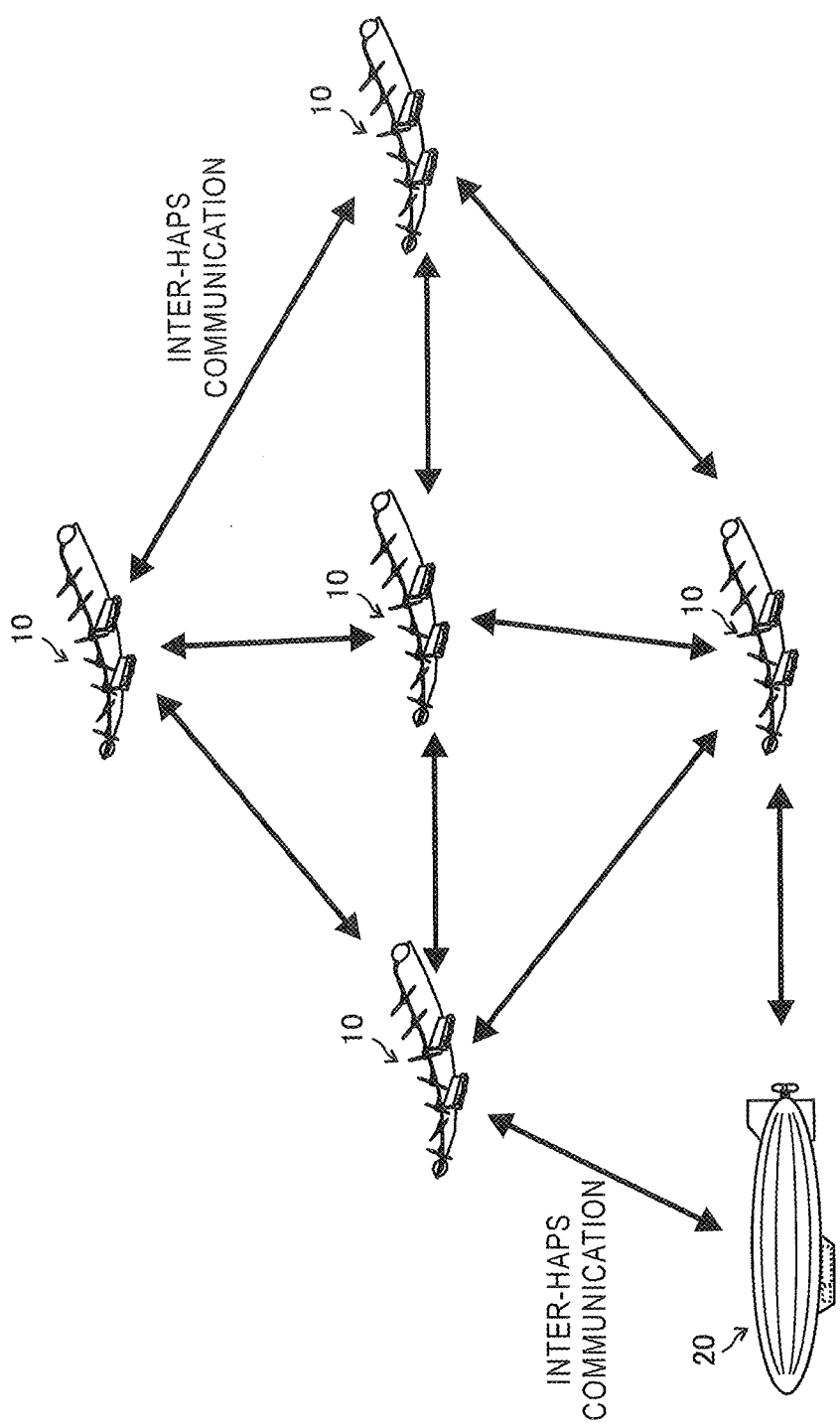
FIG. 4 is an explanatory diagram showing an example of a radio network formed in an upper airspace by a plurality of HAPSs in the embodiment.

FIG. 4 is an explanatory diagram showing an example of a radio network formed in an upper airspace by the plurality of HAPSs 10 and 20 in the embodiment. The plurality of HAPSs 10 and 20 are configured to be able to perform an optical communication (inter-HAPS communication) with each other in the upper airspace, and form a radio communication network excellent in robustness capable of stably over a wide area realizing a three-dimensional network. The radio communication network can also function as an ad hoc network by dynamic routing according to various environments and various information. The radio communication network may be formed to have various two-dimensional or three-dimensional topologies, and may be, for example, a mesh-type radio communication network as shown in FIG. 4.

Figure 5:
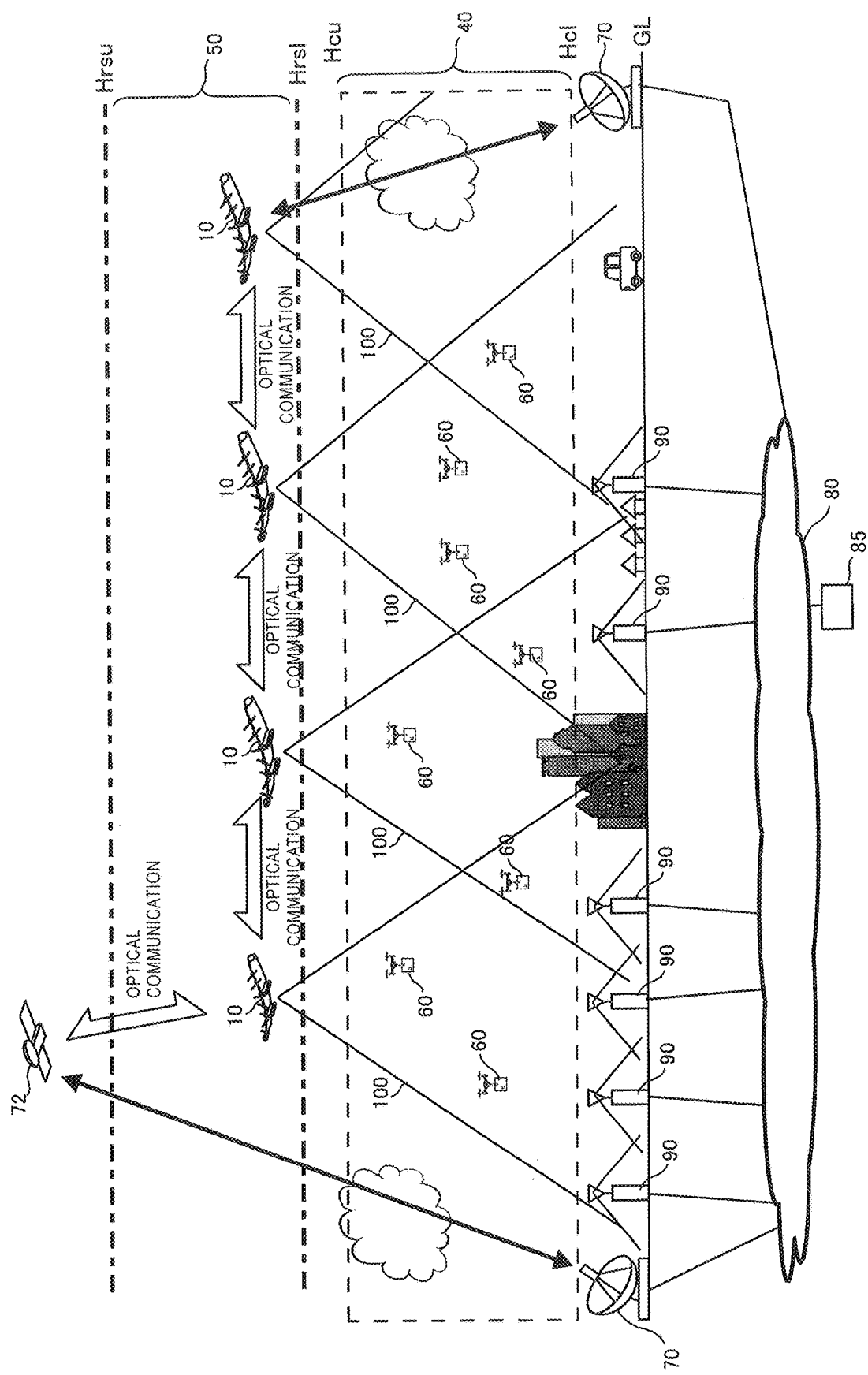
FIG. 5 is a schematic configuration diagram showing an example of an overall configuration of a communication system for realizing a three-dimensional network according to still another embodiment.

FIG. 5 is a schematic configuration diagram showing an example of an overall configuration of a communication system for realizing a three-dimensional network according to still another embodiment. It is noted that, in FIG. 5, parts common to those in FIG. 1 described above are denoted by the same reference numerals and explanation thereof will be omitted.

In the embodiment of FIG. 5, a communication between the HAPS 10 and the core network of the mobile communication network 80 is performed via the feeder station 70 and a low orbital artificial satellite 72. In this case, a communication between the artificial satellite 72 and the feeder station 70 may be performed by a radio communication using a radio wave such as a microwave, or may be performed by an optical communication using a laser light or the like. A communication between the HAPS 10 and the artificial satellite 72 is performed by an optical communication using a laser light or the like.

Figure 6:
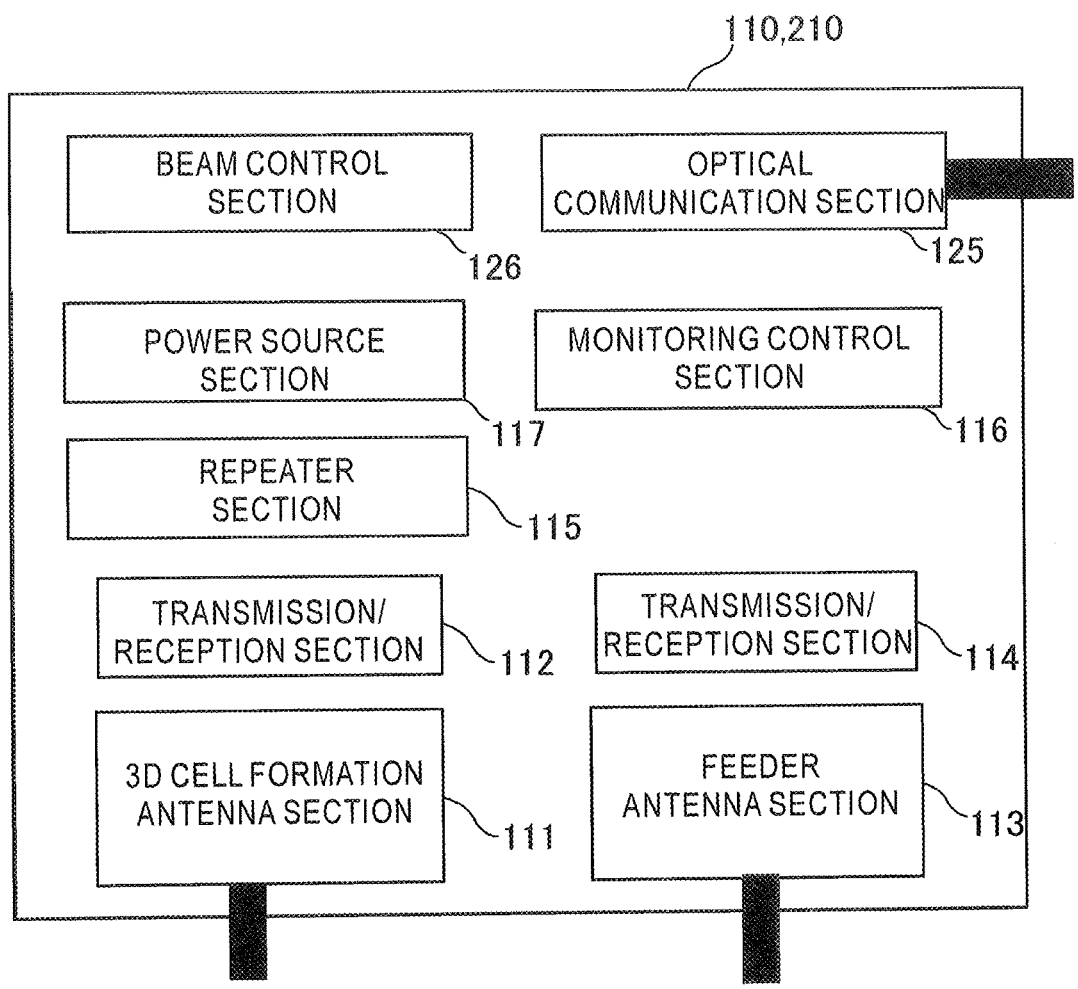
FIG. 6 is a block diagram showing a configuration example of a radio relay station of the HAPS in the embodiment.

FIG. 6 is a block diagram showing a configuration example of the radio relay stations 110 and 210 of the HAPSs 10 and 20 in the embodiment. The radio relay stations 110 and 210 in FIG. 5 are examples of a repeater-type radio relay station. Each of the radio relay stations 110 and 210 includes a 3D cell (three-dimensional cell)-formation antenna section 111, a transmission/reception section 112, a feeder antenna section 113, a transmission/reception section 114, a repeater section 115, a monitoring control section 116 and a power source section 117. Further, each of the radio relay stations 110 and 210 includes an optical communication section 125 and a beam control section 126 used for an inter-HAPS communication, etc.

The 3D cell-formation antenna section 111 has antennas for forming radial beams 100 and 200 toward the cell-formation target airspace 40, and forms three-dimensional cells 41 and 42 in which a communication with the terminal apparatus can be performed. The transmission/reception section 112 has a transmission/reception duplexer (DUP: DUPlexer) and an amplifier, etc., and transmits radio signals to the terminal apparatuses located in the three-dimensional cells 41 and 42 and receives radio signals from the terminal apparatuses via the 3D cell-formation antenna section 111.

The feeder antenna section 113 has a directional antenna for performing a radio communication with the feeder station 70 on the ground or on the sea. The transmission/reception section 114 has a transmission/reception duplexer (DUP: DUPlexer) and an amplifier, etc., and transmits radio signals to the feeder station 70 and receives radio signals from the feeder station 70 via the 3D cell-formation antenna section 111.

The repeater section 115 relays signals of the transmission/reception section 112 which is transmitted to and received from the terminal apparatus and signals of the transmission/reception section 114 which is transmitted to and received from the feeder station 70. The repeater section 115 may have a frequency conversion function.

The monitoring control section 116 is configured with, for example, a CPU and a memory, etc., and monitors the operation processing status of each section and controls each section in the HAPSs 10 and 20, by executing the preinstalled program. The power source section 117 supplies an electric power outputted from the batteries 106 and 204 to each section in the HAPSs 10 and 20. The power source section 117 may have a function of storing an electric power generated by the solar-power generation panel, etc. and an electric power supplied from outside in the batteries 106 and 204.

The optical communication section 125 communicates with neighboring other HAPSs 10 and 20 and an artificial satellite via an optical communication medium such as a laser light. This communication enables dynamic routing that dynamically relays a radio communication between the mobile communication network 80 and a terminal apparatus such as the drone 60, and can enhance a robustness of the mobile communication system by backing up and relaying wirelessly the other HAPSs when one of the HAPSs fails.

The beam control section 126 controls direction and intensity of a beam such as a laser light used for an inter-HAPS communication and a communication with an artificial satellite, and performs control so as to switch another HAPS (radio relay station) for performing communication by an optical beam such as the laser light in accordance with a change in a relative position to neighboring another HAPS (radio relay station). This control may be performed based on, for example, a position and posture of the HAPS itself, a position of the neighboring HAPS, and the like. Information on the position and posture of the HAPS itself may be acquired based on an output of a GPS receiver, a gyro sensor, an acceleration sensor, etc. incorporated in the HAPS, and information on the position of the neighboring HAPS may be acquired from the remote control apparatus 85 or another HAPS management server provided in the mobile communication network 80.

Figure 7:
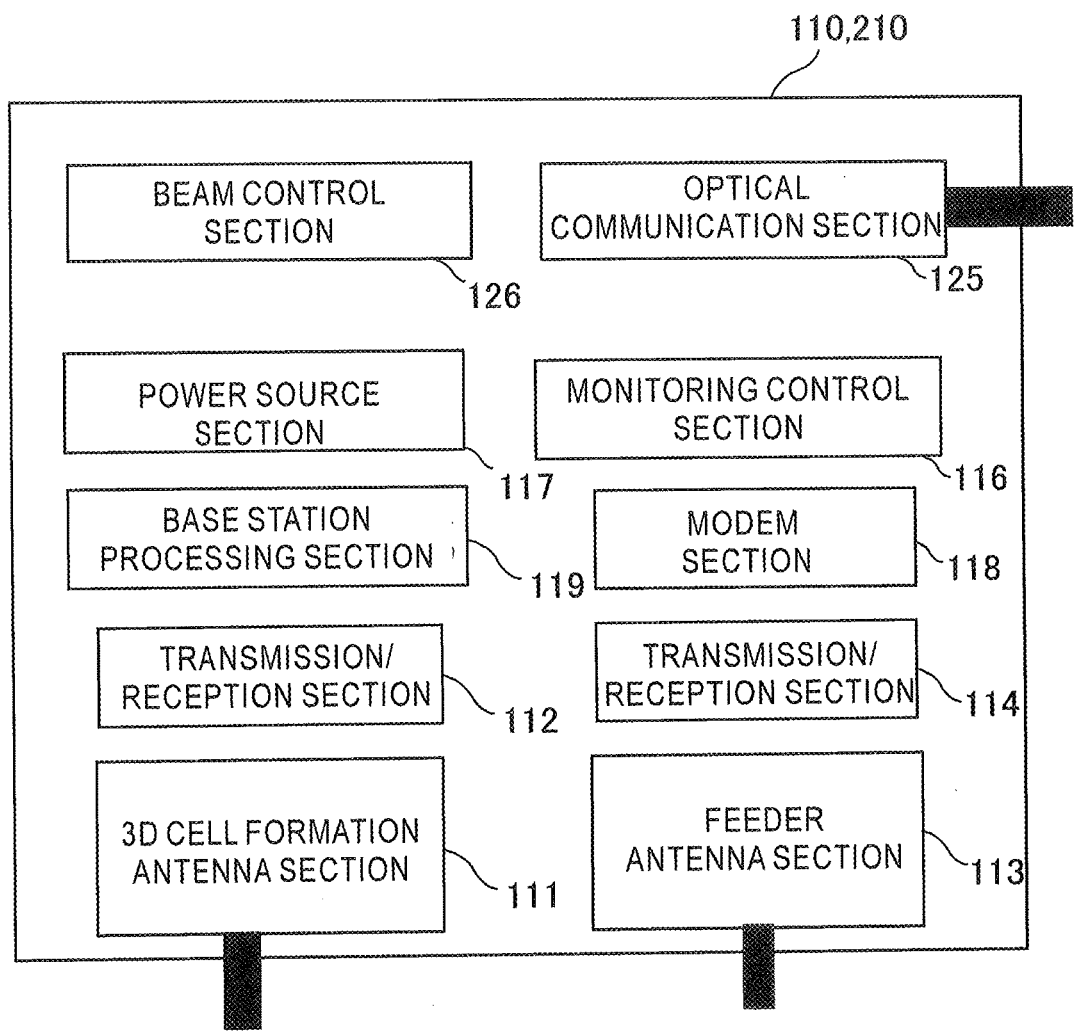
FIG. 7 is a block diagram showing another configuration example of a radio relay station of the HAPS in the embodiment.

FIG. 7 is a block diagram showing another configuration example of the radio relay stations 110 and 210 of the HAPSs 10 and 20 in the embodiment. The radio relay stations 110 and 210 in FIG. 7 are examples of a base-station type radio relay station. It is noted that, in FIG. 7, configuration elements similar to those in FIG. 6 are denoted by the same reference numerals and explanation thereof will be omitted. Each of the radio relay stations 110 and 210 in FIG. 7 further includes a modem section 118 and a base station processing section 119 instead of the repeater section 115. Further, each of the radio relay stations 110 and 210 includes the optical communication section 125 and the beam control section 126.

The modem section 118, for example, performs a demodulation processing and a decoding processing for a received signal received from the feeder station 70 via the feeder antenna section 113 and the transmission/reception section 114, and generates a data signal to be outputted to the base-station processing section 119. The modem section 118 performs an encoding processing and a modulation processing for the data signal received from the base-station processing section 119, and generates a transmission signal to be transmitted to the feeder station 70 via the feeder antenna section 113 and the transmission/reception section 114.

The base-station processing section 119, for example, has a function as an e-Node B that performs a baseband processing based on a method conforming to the standard of LTE/LTE-Advanced. The base-station processing section 119 may process in a method conforming to a future standard of mobile communication such as the fifth generation or the next generation after the fifth generation onwards.

The base station processing section 119, for example, performs a demodulation processing and a decoding processing for a received signal received from a terminal apparatus located in the three-dimensional cells 41 and 42 via the 3D cell-formation antenna section 111 and the transmission/reception section 112, and generates a data signal to be outputted to the modem section 118. The base-station processing section 119 performs an encoding processing and a modulation processing for the data signal received from the modem section 118, and generates a transmission signal to be transmitted to the terminal apparatus of the three-dimensional cells 41 and 42 via the 3D cell-formation antenna section 111 and the transmission/reception section 112.

Figure 8:
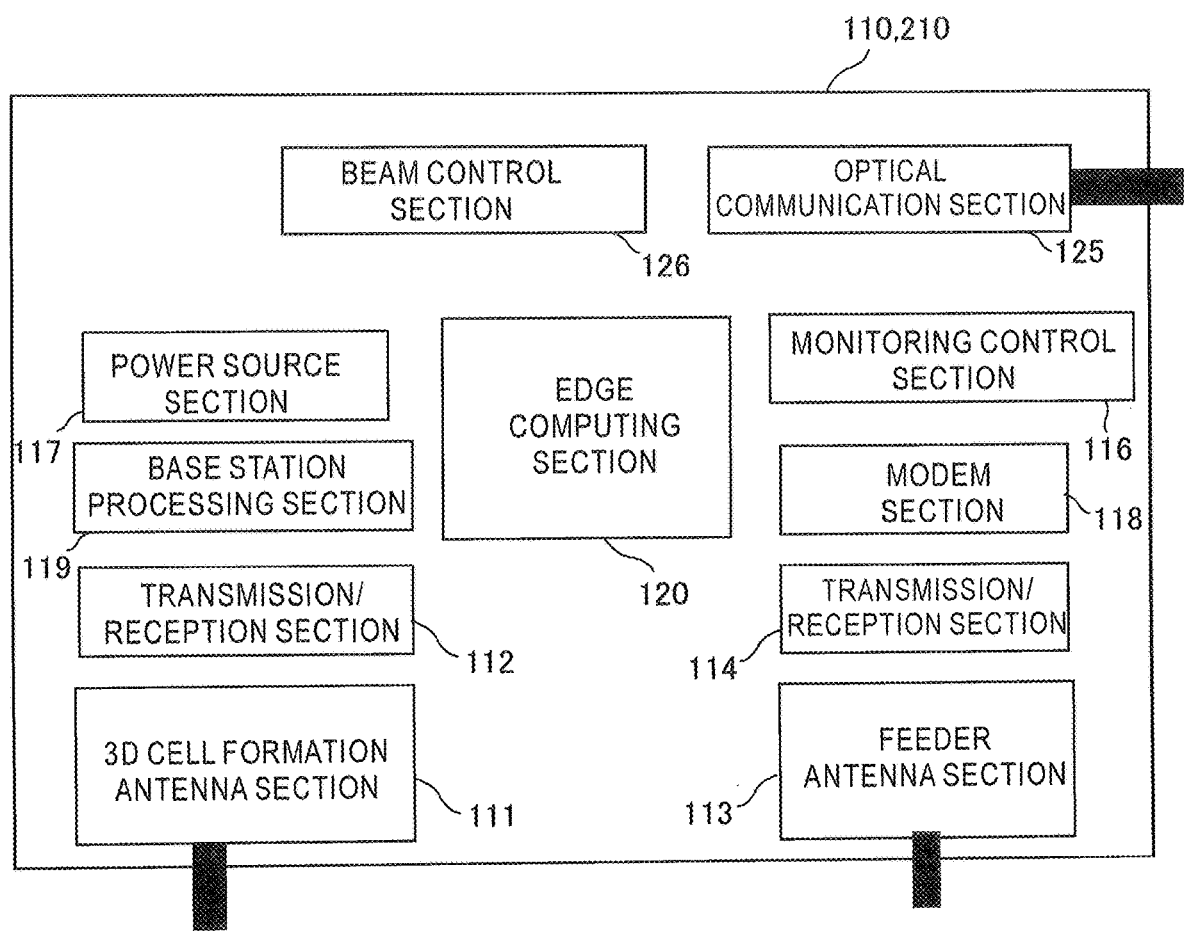
FIG. 8 is a block diagram showing still another configuration example of a radio relay station of the HAPS in the embodiment.

FIG. 8 is a block diagram showing still another configuration example of the radio relay stations 110 and 210 of the HAPSs 10 and 20 in the embodiment. The radio relay stations 110 and 210 in FIG. 8 are examples of a high performance base-station type radio relay station having an edge computing function. It is noted that, in FIG. 8, configuration elements similar to those in FIG. 6 and FIG. 7 are denoted by the same reference numerals, and explanation thereof will be omitted. Each of the radio relay stations 110 and 210 in FIG. 8 further includes an edge computing section 120 in addition to the configuration elements of FIG. 7.

The edge computing section 120 is configured with, for example, a compact computer, and can perform various types of information processing relating to a radio relay, etc., in the radio relay stations 110 and 210 of the HAPSs 10 and 20, by executing a preinstalled program.

The edge computing section 120, for example, determines a transmission destination of a data signal based on a data signal received from a terminal apparatus located in the three-dimensional cells 41 and 42, and performs a process of switching a relay destination of communication based on the determination result. More specifically, in case that the transmission destination of the data signal outputted from the base-station processing section 119 is a terminal apparatus located in the own three-dimensional cells 41 and 42, instead of passing the data signal to the modem section 118, the edge computing section 120 returns the data signal to the base-station processing section 119 and transmits the data signal to the terminal apparatus of the transmission destination located in the own three-dimensional cells 41 and 42. On the other hand, in case that the transmission destination of the data signal outputted from the base-station processing section 119 is a terminal apparatus located in another cell other than the own three-dimensional cells 41 and 42, the edge computing section 120 passes the data signal to the modem section 118 and transmits the data signal to the feeder station 70, and transmits the data signal to the terminal apparatus of the transmission destination located in the other cell of the transmission destination via the mobile communication network 80.

The edge computing section 120 may perform a process of analyzing information received from a large number of terminal apparatuses located in the three-dimensional cells 41 and 42. This analysis result may be transmitted to the large number of terminal apparatuses located in the three-dimensional cells 41 and 42, and may be transmitted to a server, etc. of the mobile communication network 80.

Uplink and downlink duplex methods for radio communication with a terminal apparatus via the radio relay stations 110 and 210 are not limited to a specific method, and may be, for example, a time division duplex method (Time Division Duplex: TDD) or a frequency division duplex method (Frequency Division Duplex: FDD). An access method for radio communication with a terminal apparatus via the radio relay stations 110 and 210 is not limited to a specific method, and may be, for example, FDMA (Frequency Division Multiple Access) method, TDMA (Time Division Multiple Access) method, CDMA (Code Division Multiple Access) method or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using a plurality of antennas for both of transmission and reception. The MIMO technology may be an SU-MIMO (Single-User MIMO) technology in which one base station transmits a plurality of signals to one terminal apparatus at the same time/same frequency, and may be an MU-MIMO (Multi-User MIMO) technology in which one base station transmits signals to a plurality of different communication terminal apparatuses at the same time/same frequency or a plurality of different base stations transmit signals to one terminal apparatus at the same time/same frequency.

In the above embodiment, since the stratosphere with an altitude of 11 [km] or more and 50 [km] or less where the HAPSs 10 and 20 are located and an upper airspace above it are not easily affected by the atmosphere, the optical communication is suitable for communication in those spaces. In particular, in the optical communication, since a light such as a laser light of a communication medium has a shorter wavelength and a higher frequency compared to a radio wave such as a microwave, a high-speed and large-capacity communication is possible, and there is no problem of radio frequency resources.

However, since the foregoing optical beam such as a laser light used for the inter-HAPS communication and the communication with the artificial satellite has a strong directivity, an alignment of an optical axis is important. In particular, since the solar plane type HAPS 10 constantly changes the attitude and position of the airframe, there is a problem how to maintain transmission and reception of optical signals. In particular, in case of the inter-HAPS communication, the problem is greater because the position between the HAPSs changes with each other.

Therefore, in the present embodiment, in order to maintain the inter-HAPS communication and the communication with the artificial satellite even if the positions and attitudes of the HAPSs 10 and 20 change in the upper airspace, the HAPSs 10 and 20 use an optical antenna apparatus that can be controlled so that an outward directional beam changes. Then, optical beam control information for directing a directional beam of the optical antenna apparatus to an optical communication destination such as other HAPS or artificial beam is acquired, and the directional beam (optical beam) of the optical antenna apparatus is controlled to be directed toward the optical communication destination based on the acquired optical beam control information.

Figure 9:
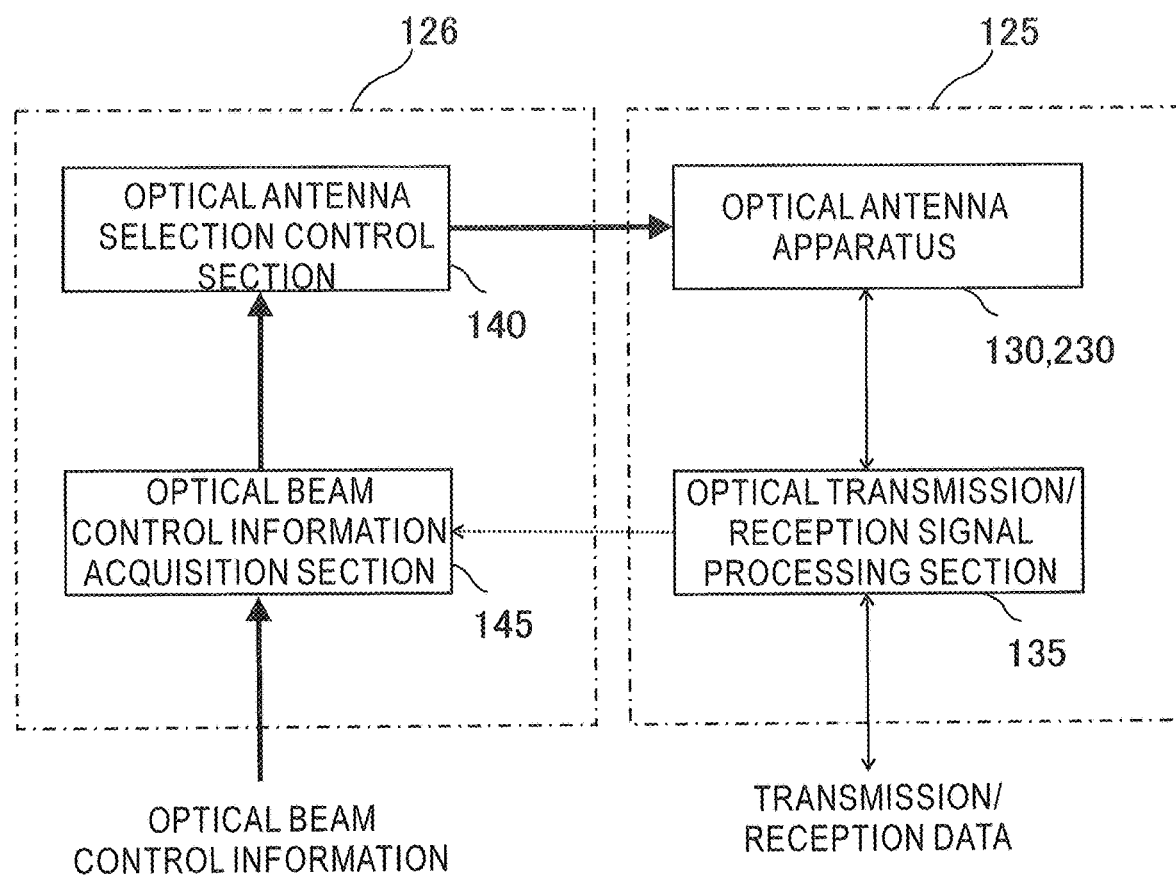
FIG. 9 is a schematic configuration diagram showing a configuration example of an optical communication section and a beam control section of the HAPS in the embodiment.

FIG. 9 is a schematic configuration diagram showing a configuration example of the optical communication section 125 and the beam control section 126 of the HAPSs 10 and 20 in the embodiment. In FIG. 9, the optical communication section 125 includes optical antenna apparatuses 130 and 230 for transmitting and receiving a beam-formed light such as laser light, and an optical transmission/reception signal processing section 135 for processing an optical signal that is transmitted and received via the optical antenna apparatuses 130 and 230. The optical antenna apparatuses 130 and 230 have a plurality of optical antennas with outward directivities different from each other. Each optical antenna can be configured, for example, using light emitting elements such as high-power type semiconductor lasers, high-sensitivity type light receiving elements, and optical elements such as lenses.

The optical transmission/reception signal processing section 135 processes an optical signal, which is received by the optical antenna apparatuses 130 and 230 and converted into an electrical signal, to generate a reception data, and processes a transmission data to generate an optical signal to be sent to the optical antenna apparatuses 130 and 230.

The beam control section 126 includes an optical antenna selection control section 140 and an optical beam control information acquisition 145. The optical beam control information acquisition section 145 acquires optical beam control information for directing the optical beam (directive beam) of the optical antenna apparatuses 130 and 230 to the optical communication destination. The optical beam control information is, for example, information such as attitudes and positions of the HAPSs 10 and 20, a position of the optical communication destination such as the HAPS or the artificial satellite, and a reception strength or reception sensitivity for each optical antenna obtained from the optical communication section 125. The optical beam control information includes at least one of these kinds of information.

The information on the attitudes of HAPSs 10 and 20 is, for example, a roll angle, a pitch angle and a yaw angle which are measured in advance with respect to a measurement reference portion at a predetermined position of the optical antenna apparatus, with reference to the gravity direction and the true north direction of the earth. The information on the positions of the HAPSs 10 and 20 and the optical communication destination is, for example, position information (latitude, longitude, altitude) obtained based on a GPS reception signal. As described above, the information on the position and attitude of the HAPS itself can be acquired based on an output of a GPS reception apparatus, a gyro sensor, an acceleration sensor, etc., which are incorporated in the HAPS, and the information on the positions of the neighboring HAPSs and the artificial satellites can be acquired from the remote control apparatus 85 or another HAPS management server provided in the mobile communication network 80.

The information on the reception strength and the reception sensitivity of the optical beam is, for example, information on a reception strength and a reception sensitivity, which are measured for the optical antenna in using for an optical communication and the optical antenna disposed in the vicinity thereof, among the plurality of optical antennas constituting the optical antenna apparatuses 130 and 230. The information on the reception strength and the reception sensitivity of the optical beam can be acquired, for example, from the optical transmission/reception signal processing section 135 of the optical communication section 125.

Figure 10:
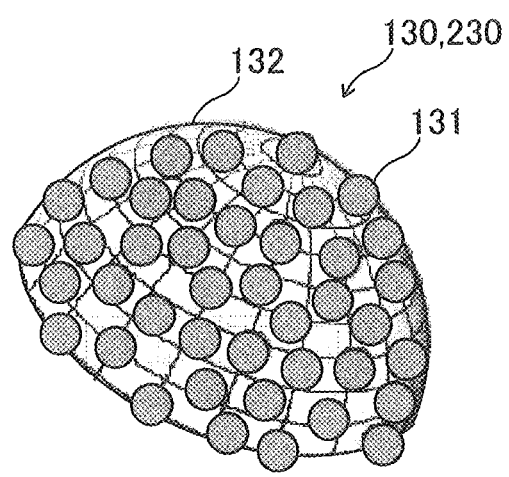
FIG. 10 is a schematic configuration diagram showing a configuration example of an antenna apparatus in an optical communication section of the HAPS in the embodiment.

FIG. 10 is a schematic configuration diagram showing a configuration example of the optical antenna apparatuses 130 and 230 in the optical communication section 125 of the HAPS in the embodiment. In FIG. 10, in the optical antenna apparatuses 130 and 230, a plurality of optical antennas 131 are arranged at equal intervals on an outer peripheral surface of a hemispherical dome-like base member 132. By providing the optical antenna apparatuses 130 and 230 in combination in the opposite direction to the left and right side end portions of the HAPS 10 and the upper and lower end portions of the HAPS 20 as shown in FIGS. 2 and 3, a three-dimensional optical antenna apparatus capable of aligning optical axes in omnidirection. The plurality of optical antennas 131 may be disposed so that the directional beams of the optical antennas adjacent to each other partially overlap.

In the case of the optical antenna apparatuses 130 and 230 in FIG. 10, the beam control section 126 performs a control so that an optical antenna used for optical communication with the optical communication destination is selected from the plurality of optical antennas 131 based on the optical beam control information.

Here, the following control may be performed to maintain a continuous optical communication at a time of handover for switching the optical antenna 131. For example, the beam control section 126 may perform a control to predict and sequentially select an optical antennas used for optical communication with the optical communication destination based on a time change of the optical beam control information such as the reception sensitivity of the foregoing optical antenna in communication and the optical antenna in the vicinity thereof. When switching of the optical antenna 131, the optical communication section 125 may perform an optical communication with the optical communication destination so as to synchronize and overlap the optical communication via each of the plurality of optical antennas with each other for a predetermined time before and after the switching. The optical communication section 125 may control to stop or reduce a power supply to the optical antenna that is not used for the optical communication with the optical communication destination among the plurality of optical antennas 131, in order to reduce a power consumption. The optical antenna apparatuses 130 and 230 may be configured to be capable of adjusting at least one of a direction and a divergence angle of the directional beam of the optical antenna 131 in order to accurately align the optical axis with the optical communication destination.

Figure 11:
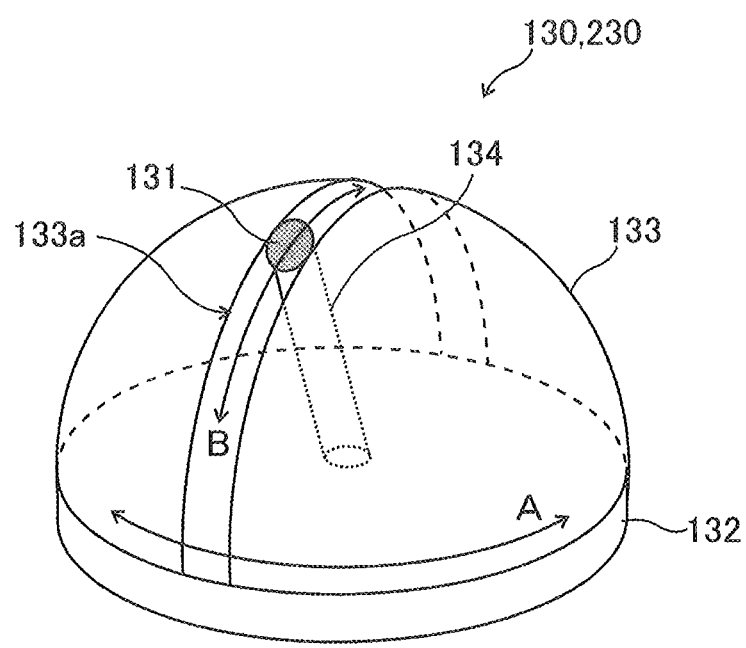
FIG. 11 is a schematic configuration diagram showing another configuration example of an antenna apparatus in an optical communication section of the HAPS in the embodiment.

It is noted that, although the plurality of optical antennas are disposed in the example of FIG. 9 and FIG. 10, a single optical antenna 131 may be configured to be rotationally driven as shown in FIG. 11.

In FIG. 11, an antenna drive section for rotationally driving the optical antenna 131 is configured using a disk-like base member 132 that is fixedly disposed, a hemispherical dome-like rotation member 133 that can be rotationally driven in the direction A in the figure on the base member 132, and a support arm member 134 that is provided with the optical antenna 131 at the tip thereof and is capable of swinging around the center of the rotation member 133 as a swing axis so that the optical antenna 131 moves in the direction B in the figure while directing the directivity outward along a slit 133a formed on the outer peripheral surface of the rotation member 133. A drive section for rotating the rotation member 133 and a drive section for swinging the support arm member 134 may be configured by a motor, a gear, and the like. By rotating the rotation member 133 and swinging the support arm member 134, a directional beam of the optical antenna 131 can be changed in any direction of the hemispherical surface. Furthermore, by combining and disposing the two optical antenna apparatuses 130 and 230 in FIG. 11 in directions vertically opposite to each other, it is possible to control the optical antenna 131 to be directed in omnidirection based on the aforementioned optical beam control information.

As described above, according to the present embodiment, since the communication between the HAPSs 10 and 20 forming the three-dimensional cell and the communication between the HAPSs 10 and 20 and the artificial satellite 72 can be stably performed by the optical communication capable of performing a high-speed and large-capacity communication, it is possible to stably over a wide area realize a three-dimensional network, in which a propagation delay is low, simultaneous connections with a large number of terminal apparatuses in wide-range and high-speed communications can be performed, and a system capacity per unit area is large, in radio communications with terminal apparatuses including devices for the IoT. Moreover, since the optical communication is used for the communication between the HAPSs 10 and 20 and the communication between the HAPSs 10 and 20 and the artificial satellite 72, there is no influence on radio wave frequency resources.

It is noted that, the process steps and configuration elements of the radio relay station of the radio relay apparatus, the feeder station, the remote control apparatus, terminal apparatus (user apparatus, mobile station, communication terminal) and the base station described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, base station apparatus, radio relay station apparatus, terminal apparatus (user apparatus, mobile station, communication terminal), remote control apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 HAPS (solar plane type)
20 HAPS (airship type)
40 cell-formation target airspace
41, 42, 43 three-dimensional cell
50 airspace where HAPS is located
60 drone
65 airplane
70 feeder station
72 artificial satellite
75 microwave power supply station
80 mobile communication network
85 remote control apparatus
86 server apparatus
100, 200, 300 beam
101 main wing section
102 solar panel (solar power generation panel)
103 propeller
104 connecting section
105 pod
106 battery
107 wheel
108 power receiving pod
110, 210 radio relay station
111 three-dimensional (3D) cell-formation antenna section
112 transmission/reception section
113 feed antenna section
114 transmission/reception section
115 repeater section
116 monitoring control section
117 power source section
118 modem section
119 base station processing section
120 edge computing section
125 optical communication section
126 beam control section
130, 230 optical antenna apparatus
131 optical antenna
132 base member 133 rotation member
133a slit of the rotation member
134 support arm member
135 optical transmission/reception signal processing section
140 optical antenna selection control section
145 optical beam control information acquisition section

The invention claimed is:

1. A radio relay apparatus comprising a radio relay station for relaying a radio communication between a terrestrial base station and a terminal apparatus, the radio relay apparatus comprising:
  a floating object provided with the radio relay station and controlled so as to be located in a floating airspace by an autonomous control or an external control;
  an optical communication section for performing an optical communication with an optical communication destination via an optical antenna apparatus controllable to change an outgoing directional beam; and
  a beam control section for acquiring optical-beam control information for directing the directional beam of the optical antenna apparatus to the optical communication destination and controlling the directional beam of the optical antenna apparatus to be directed to the optical communication destination based on the acquired optical-beam control information;
  wherein the optical antenna apparatus comprises a plurality of optical antennas with outward directivities different from each other; and
  wherein the beam control section selects an optical antenna to be used for an optical communication with the optical communication destination based on the optical-beam control information; and
  wherein the optical communication section performs, when for a predetermined time before and after the switching.

2. The radio relay apparatus according to claim 1, wherein the optical-beam control information includes at least one of an attitude and a position of the floating object, a position of the optical communication destination, and a reception strength and a reception sensitivity of the optical communication section.

3. The radio relay apparatus according to claim 1, wherein the beam control section predicts and sequentially select an optical antenna to be used for the optical communication with the optical communication destination based on a time change of the optical-beam control information.

4. The radio relay apparatus according to claim 1, wherein the plurality of optical antennas are disposed so that directional beams of the optical antennas adjacent to each other partially overlap.

5. The radio relay apparatus according to claim 1, wherein the optical communication section controls to stop or reduce a power supply to the optical antenna that is not used for the optical communication with the optical communication destination among the plurality of optical antennas.

6. The radio relay apparatus according to claim 1,
  wherein the optical antenna apparatus comprises:
    an optical antenna with a directivity; and
    an antenna drive section for driving the optical antenna to change the directional beam of the optical antenna, and
  wherein the beam control section controls the antenna drive section based on the acquired optical-beam control information.

7. The radio relay apparatus according to claim 1,
  wherein the optical antenna apparatus is configured to be capable of adjusting at least one of a direction and a divergence angle of the directional beam.

8. The radio relay apparatus according to claim 1,
  wherein the floating object is a solar plane comprising:
    a wing provided with a photovoltaic power generation panel for generating an electric power to be supplied to the radio relay station; and
    a rotationally drivable propeller mounted on the wing.

9. The radio relay apparatus according to claim 1,
  wherein the floating object is an airship comprising a battery for supplying an electric power to the radio relay station.

10. The radio relay apparatus according to claim 1,
  wherein the optical communication section controls an optical strength in accordance with a change in a relative position to the optical communication destination.

11. The radio relay apparatus according to claim 1,
  wherein the optical communication section controls to reduce an optical strength in a time period of night.

12. The radio relay apparatus according to claim 1,
  wherein the beam control section or the optical communication section is controlled by a remote control apparatus.

13. A remote control apparatus for remotely performing a control in the beam control section or the optical communication section of the radio relay apparatus according to claim 12.

14. The radio relay apparatus according to claim 1,
  wherein the communication destination of the optical communication includes another aerial-floating type radio relay apparatus located in the floating airspace.

15. The radio relay apparatus according to claim 1,
  wherein the communication destination of the optical communication includes an artificial satellite.

16. The radio relay apparatus according to claim 1,
  wherein the radio relay apparatus forms a three-dimensional cell in a predetermined cell-formation target airspace between a ground level or a sea level, and
  wherein an altitude of the cell-formation target airspace is less than or equal to 10 [km].

17. The radio relay apparatus according to claim 16,
  wherein an altitude of the cell-formation target airspace is 50 [m] or more and 1 [km] or less.

18. The radio relay apparatus according to claim 1,
  wherein the floating object is controlled to be located at an altitude less than or equal to 100 [km].

19. The radio relay apparatus according to claim 18,
  wherein the floating object is located in a stratosphere with an altitude more than or equal to 11 [km] and less than or equal to 50 [km].

20. A communication system, comprising one or more of the radio relay apparatus according to claim 1.

21. The communication system according to claim 20, further comprising two or more of the radio relay apparatuses that form a two-dimensional or three-dimensional radio communication network.

22. The communication system according to claim 20, further comprising a remote control apparatus for remotely performing a control in the beam control section or the optical communication section of the radio relay apparatus.

23. The communication system according to claim 20, further comprising at least one of a terrestrial base station and a terminal apparatus.

* * * * *